United States Patent
Kanoffsky et al.

(10) Patent No.: US 12,044,134 B2
(45) Date of Patent: Jul. 23, 2024

(54) ADJUSTMENT RING FOR A VARIABLE TURBINE GEOMETRY

(71) Applicant: BorgWarner Inc., Auburn Hills, MI (US)

(72) Inventors: Nico Kanoffsky, Bolanden (DE); Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/112,900

(22) Filed: Feb. 22, 2023

(65) Prior Publication Data

US 2024/0200466 A1   Jun. 20, 2024

(30) Foreign Application Priority Data

Dec. 15, 2022   (DE) .................. 10 2022 213 729.9

(51) Int. Cl.
| | | |
|---|---|---|
| *F01D 17/16* | (2006.01) | |
| *F01D 9/04* | (2006.01) | |
| *F02B 37/24* | (2006.01) | |
| *F02C 9/22* | (2006.01) | |

(52) U.S. Cl.
CPC .............. *F01D 17/165* (2013.01); *F01D 9/04* (2013.01); *F02B 37/24* (2013.01); *F02C 9/22* (2013.01); *F05D 2220/40* (2013.01)

(58) Field of Classification Search
CPC .......... F01D 17/165; F01D 9/04; F02B 37/24; F02C 9/22; F05D 2220/40
See application file for complete search history.

(56) References Cited

U.S. PATENT DOCUMENTS

| | | | |
|---|---|---|---|
| 10,633,999 B2 * | 4/2020 | Jennes .................... | F01D 17/12 |
| 2012/0315164 A1 * | 12/2012 | Mayernick ............... | F02C 6/12 |
| | | | 417/406 |
| 2016/0237838 A1 * | 8/2016 | Kennedy .................. | F02C 6/12 |
| 2017/0226888 A1 * | 8/2017 | Howell .................. | F01D 17/165 |
| 2017/0234153 A1 * | 8/2017 | Williams ................ | F01D 9/041 |
| | | | 415/148 |

* cited by examiner

*Primary Examiner* — Hoang M Nguyen

(74) *Attorney, Agent, or Firm* — Eric L. Doyle; Stephan A. Pendorf; Patent Central LLC

(57) ABSTRACT

An adjustment ring (200) for a variable turbine geometry (100). The adjustment ring (200) comprises a disk-shaped body (210) and a plurality of coupling regions (220) which are configured in the disk-shape body (210). The coupling regions (220) are spaced apart in the circumferential direction (26), and each coupling region (220) is adapted for at least partially receiving a vane lever (140) for adjusting a guide vane (120) of a variable turbine geometry (100). Each coupling region (220) circumferentially is fully surrounded by the disk-shaped body (210). The disk-shaped body (210) on one or more of the coupling regions (220) has at least one reinforcement means (230) which extends in the axial direction (22) from the disk-shaped body (210) and circumferentially at least partially surrounds the coupling region (220).

20 Claims, 6 Drawing Sheets

ADJUSTMENT RING FOR A VARIABLE TURBINE GEOMETRY

TECHNICAL FIELD

The present invention relates to an adjustment ring for a variable turbine geometry, to a variable turbine geometry for a turbine having an adjustment ring of this type, to a turbine for a charging device having an adjustment ring of this type, to a charging device for an internal combustion engine or a fuel cell having an adjustment ring of this type, and to a method for producing an adjustment ring of this type.

BACKGROUND

Ever more vehicles of the newer generation are equipped with charging devices in order to achieve the target requirements and statutory stipulations. In the development of charging devices, it is an objective to optimize the individual components as well as the system in its entirety in terms of their reliability and efficiency.

Known charging devices in most instances have at least one compressor having a compressor wheel which is connected to a drive unit by way of a common shaft. The compressor compresses the fresh air inducted for the internal combustion engine or for the fuel cell. As a result, the quantity of air or oxygen which is available to the engine for combustion, or available to the fuel cell for reaction, is increased. This in turn leads to an increase in the output of the internal combustion engine or of the fuel cell, respectively. Charging devices can be equipped with different drive units. Known in the prior art are in particular E-chargers in which the compressor is driven by way of an electric motor, and turbochargers in which the compressor is driven by way of a turbine, in particular a radial turbine. As opposed to an axial turbine (as is provided in aircraft engines, for example) in which the inflow takes place substantially exclusively in an axial manner, the exhaust gas flow in the case of a radial turbine is guided, by a spiral-shaped turbine inlet, in a substantially radial manner, and in the case of a mixed-flow radial turbine, in a semi-radial manner, thus with at least one small axial component, onto the turbine wheel. Apart from the E-charger and the turbocharger, combinations of both systems, which are also referred to as E-turbo, are described in the prior art.

In order to increase the efficiency of turbines and adapt said efficiency to different operating points, modern charging devices are equipped with an output adjustment installation with the aid of which the generation of output of the charging device can be adjusted or varied, respectively. Known output adjustment installations include, for example, variable turbine geometry (VTG) or a waste gate flap (WG). A variable turbine geometry is an adjustable guide apparatus for varying an inflow to a turbine wheel of the turbine. The flow velocity of the exhaust gas flow fed to the turbine wheel can in particular be varied by varying the inflow (for example the flow cross section and the angle of incident flow), this leading to a corresponding change in the output of the charging device. Systems of this type are also referred to as variable guide vanes, VTGs, guide grids, or VTG guide grids.

Known variable turbine geometries often have a vane bearing ring having a multiplicity of adjustable guide vanes which are mounted in this vane bearing ring in the form of a rim and which are in each case adjustable from a substantially tangential position in terms of the rim to an approximately radial position. The adjustable guide vanes are in each case coupled, in most instances by way of adjustment levers, to an adjustment ring which is disposed coaxially with the vane bearing ring. The guide vanes can be adjusted and the inflow to the turbine wheel can varied by a movement of the adjustment ring, for example a rotation in the circumferential direction. The rotation of the adjustment ring in the circumferential direction here is provided by way of an actuating installation. The actuating installation is in particular provided for generating control movements, that are to be transmitted to the variable turbine geometry, by way of the adjustment ring. The actuating installation usually has an actuator which is coupled to the adjustment ring by way of an adjustment shaft assembly. An engagement between an inner lever and an actuating pin of the adjustment ring is often provided for mechanically coupling the actuating installation to the adjustment ring. The multiplicity of moving individual parts of the variable turbine geometry often requires complex and cost-intensive assembly and may lead to issues relating to wear during operation. Issues relating to wear on the adjustment ring and on the adjustment levers can often arise by virtue of the interaction of the components during adjustments as well as due to pulsating exhaust gas forces and the onward transmission of the latter by way of the guide vanes and the vane levers to the point of engagement. This can lead to damage to the adjustment ring and to the adjustment levers, as well as to a reduced service life of the variable turbine geometry, or of the turbine and/or the charging device in which the variable turbine geometry is used.

It is an object of the present invention to provide an improved adjustment ring for a variable turbine geometry.

SUMMARY OF THE INVENTION

The present invention relates to an adjustment ring for a variable turbine geometry as claimed in claim 1. The invention moreover relates to a variable turbine geometry for a turbine as claimed in claim 11 having an adjustment ring of this type. Furthermore, the invention relates to a turbine for a charging device as claimed in claim 13 having an adjustment ring of this type. Moreover, the invention relates to a charging device for an internal combustion engine or a fuel cell as claimed in claim 14 having an adjustment ring of this type, and to a method for producing an adjustment ring for a variable turbine geometry as claimed in claim 15. The dependent claims describe advantageous design embodiments of the adjustment ring, of the variable turbine geometry, of the turbine, of the charging device and of the method.

According to a first aspect of the present invention, an adjustment ring for a variable turbine geometry comprises a disk-shaped body and a plurality of coupling regions which are formed in the disk-shaped body. The coupling regions are spaced apart in the circumferential direction. Each coupling region is adapted for at least partially receiving a vane lever for adjusting a guide vane of a variable turbine geometry. Each coupling region circumferential is fully surrounded by the disk-shaped body. The disk-shaped body has, on one or more coupling regions, at least one reinforcement means which extends in the axial direction from the disk-shaped body and circumferentially at least partially surrounds the coupling region. When the coupling regions are coupled to the respective vane levers (the latter in turn being connected to guide vanes), a surface pressure can be reduced by means of the at least one reinforcement means on one or more of the coupling regions, said surface pressure potentially arising when the vane levers are adjusted by the adjustment ring. In other words, a contact face between the vane levers and the adjustment ring, in particular the coupling regions, can be enlarged by virtue of the at least one reinforcement means. A reduction of wear between the vane lever and the coupling regions can be achieved in the process. In particular, wear on the adjustment ring and/or on the adjustment levers can be reduced. A robustness of the adjustment ring and/or of the variable turbine geometry which comprises the adjustment ring can thus be improved by providing the at least one reinforcement means. Furthermore, a robustness of the adjustment ring can be increased in that each coupling region circumferentially is fully surrounded by the disk-shaped body. Moreover, a plurality of functions, such as, for example, the adjustment of the vane levers in the circumferential direction, the provision of a first detent and/or of a second detent for the adjustment of the variable turbine geometry, and/or a radial mounting of the adjustment ring in a variable turbine geometry, can be integrated in the adjustment ring as a result. Moreover, further components of a variable turbine geometry can be dispensed with and costs can thus be reduced as a result of functions being integrated in the adjustment ring.

In design embodiments, the disk-shaped body on each coupling region of the plurality of coupling regions can have the at least one reinforcement means. Each coupling region can be configured as a passage in the disk-shaped body.

In design embodiments, the at least one reinforcement means can be configured so as to be integral to the disk-shaped body. The at least one reinforcement means can be configured so as to be collar-shaped.

In design embodiments, each coupling region, in particular each passage, can have an encircling wall. The encircling wall can have a radially inner wall portion and a radially outer wall portion which extends substantially tangentially and/or in the circumferential direction. The encircling wall can have a first lateral wall portion and a second lateral wall portion which extends substantially in the radial direction. The plurality of guide vanes can be adjusted by means of the two lateral wall portions, in a movement of the adjustment ring in the circumferential direction relative to a vane bearing ring.

In design embodiments, the at least one reinforcement means can have a first reinforcement portion and at least one second reinforcement portion. The first reinforcement portion can surround the first lateral wall portion. The at least one second reinforcement portion can surround the second lateral wall portion.

In design embodiments, the at least one reinforcement means circumferentially can fully surround the coupling region.

The disk-shaped body can have a first lateral face and the second lateral face. The at least one reinforcement means can extend from the first lateral face and/or from the second lateral face. In design embodiments, the at least one reinforcement means can comprise a first reinforcement means and a second reinforcement means. The first reinforcement means can extend from the first lateral face. The second reinforcement means can extend from the second lateral face.

The at least one reinforcement means can extend up to an axial distance in the axial direction. The disk-shaped body can have a body thickness measured in the axial direction. A ratio of the axial distance to the body thickness can be between 0.25 and 1.0, in particular between 0.40 and 0.70, preferably between 0.45 and 0.60. By means of this ratio, surface pressure when coupling to the vane levers can be reduced by the at least one reinforcement means, in particular by raising a contact face. Moreover, the robustness of the adjustment ring and/or of the VTG can be enhanced.

In design embodiments, the at least one reinforcement means can have a minimum width, for example measured in the radial direction. A ratio of the minimum width to the body thickness can be between 0.10 and 0.70, in particular between 0.15 and 0.50, preferably between 0.20 and 0.35. A robustness and/or a longevity of the at least one reinforcement means can be provided by means of this ratio.

In design embodiments, the at least one reinforcement means on a side that faces away from the coupling region can be configured so as to be radiused toward the first lateral face and/or or the second lateral face. The radiused configuration can in particular have a radius. Tension peaks between the at least one reinforcement means and the disk-shaped body can be reduced or avoided by means of the radius.

The disk-shaped body in the region of each coupling location can have a radially outer web and a radially inner web. The radially outer web can define a first web width. The radially inner web can define a second web width. A ratio of the first web width and/or of the second web width to the body thickness can be between 0.15 and 0.60, in particular between 0.20 and 0.50, preferably between 0.25 and 0.35. The adjustment ring can be provided so as to be more robust and/or more stable by means of this ratio. Moreover, the radially inner web can thus function as a detent for the variable turbine geometry, and/or the radially outer web can provide a radial mounting for the adjustment ring in a variable turbine geometry.

According to a second aspect of the present invention, a variable turbine geometry for a turbine comprises a vane bearing ring and a plurality of adjustable guide vanes which are in each case rotatably mounted in the vane bearing ring by way of one vane shaft. Moreover, the variable turbine geometry comprises an adjustment ring according to the first aspect of the present invention. Each guide vane of the plurality of adjustable guide vanes is in each case connected in a rotationally fixed manner to one vane lever. Each vane lever is in each case at least partially received in a coupling region for adjusting the respective guide vane. A reduction of wear between the vane levers and the respective coupling regions can be achieved by virtue of the adjustment ring according to the first aspect of the present invention being provided in the variable turbine geometry. Wear on the adjustment ring and/or on the adjustment levers can in particular be reduced. A robustness of the variable turbine geometry in which the adjustment ring is used can thus likewise be increased by providing the at least one reinforcement means on one or a plurality of the coupling regions. Furthermore, a robustness of the variable turbine geometry can be increased in that each coupling region circumferentially is fully surrounded by the disk-shaped body. Moreover, a plurality of functions, such as, for example, the adjustment of the vane levers in the circumferential direction, the provision of a first detent and/or of a second detent for the adjustment of the variable turbine geometry, and/or a radial mounting of the adjustment ring in a variable turbine geometry, can be integrated in the adjustment ring as a result. Moreover, further components of the variable turbine geometry can be dispensed with and costs can thus be reduced as a result of the integration of functions. Consequently, the variable turbine geometry can be provided so as to be more robust. Moreover, the variable turbine geometry can be provided so as to have greater longevity.

In design embodiments, the guide vane, in particular each guide vane, can be connected in a rotationally fixed manner to the vane shaft at a first end of the vane shaft. The vane lever can be connected to the vane shaft at a second end of the vane shaft, opposite the first end.

In design embodiments, each vane lever can have a radial vane lever portion which extends radially from the vane shaft. Each vane lever can have an axial vane lever portion which extends axially toward the adjustment ring from the radial vane lever portion. In particular, the axial vane lever portion can extend axially at least partially into the respective coupling region.

In design embodiments, the variable turbine geometry can comprise a cover disk which is disposed so as to be parallel to the vane bearing ring. The plurality of adjustable guide vanes can be disposed between the cover disk and the vane bearing ring.

The adjustable guide vanes can be rotatably mounted in the vane bearing ring by way of the vane shafts so as to be uniformly distributed in the circumferential direction.

In design embodiments, the variable turbine geometry can comprise a plurality of spacer elements. The plurality of spacer elements can be disposed on the vane bearing ring so as to be distributed in the circumferential direction in such a manner that said spacer elements define an axial spacing of the vane bearing ring from the cover disk. In particular, the plurality of spacer elements can comprise at least three spacer elements.

The adjustment ring can be disposed so as to be predominantly radially outside the vane bearing ring. In design embodiments, the vane bearing ring can have, on a side that faces away from the plurality of adjustable guide vanes, a mounting for axially mounting the adjustment ring.

The plurality of adjustable guide vanes can be adjustable between a first position, which corresponds to a position of the variable turbine geometry opened to the maximum, and a second position, which corresponds to a position of the variable turbine geometry opened to the minimum, in particular by means of the adjustment ring being moved in the circumferential direction. As a result of each coupling region circumferentially being fully surrounded by the disk-shaped body, the radially inner wall can serve as the first detent for the first position or the second position. Moreover, the radially inner wall can serve as the second detent for the respective other first position or second position.

According to a third aspect of the present invention, a turbine for a charging device comprises a turbine housing which defines a feed duct and an outlet duct. Moreover, the turbine comprises a turbine wheel which, in the turbine housing, is disposed between the feed duct and the outlet duct, and a variable turbine geometry according to the second aspect of the present invention. The variable turbine geometry is disposed so as to be radially outside the turbine wheel. A reduction of wear between the vane levers and the respective coupling region can be achieved by virtue of the adjustment ring according to the first aspect of the present invention being provided in the turbine, in particular the variable turbine geometry. Wear on the adjustment ring and/or on the adjustment levers can in particular be reduced. A robustness of the turbine can thus likewise be increased by providing the at least one reinforcement means on one or a plurality of the coupling regions. Furthermore, a robustness of the turbine can be increased in that each coupling region circumferentially is fully surrounded by the disk-shaped body. Moreover, a plurality of functions, such as, for example, the adjustment of the vane levers in the circumferential direction, the provision of a first detent and/or of a second detent for the adjustment of the variable turbine geometry, and/or a radial mounting of the adjustment ring in a variable turbine geometry, can be integrated in the adjustment ring as a result. Moreover, further components of a variable turbine geometry and/or of the turbine can be dispensed with and costs can thus be reduced as a result of the integration of functions. Therefore, the turbine having the variable turbine geometry can be provided so as to be more robust. Moreover, the turbine can be produced so as to have greater longevity.

In design embodiments, the turbine can comprise an actuating installation which is operatively coupled to the adjustment ring. The actuating installation can be adapted for moving the adjustment ring in the circumferential direction. In particular, the actuating installation can be coupled to the adjustment ring by way of one or a plurality of levers and/or a control bar.

The turbine can be a radial turbine. In design embodiments, the turbine can comprise a bracing means. The bracing means can be disposed in the axial direction between the variable turbine geometry, in particular the vane bearing ring, and a turbine rear wall. The bracing means can be adapted for bracing the variable turbine geometry in relation to the turbine housing. In design embodiments, the bracing means, on a radially outer end, can bear on the vane bearing ring, and, on a radially inner end, can bear on the turbine rear wall.

In design embodiments, a heat shield can be clamped between the bracing means and the vane bearing ring. The turbine rear wall can be configured as part of a bearing housing.

According to a fourth aspect of the present invention, a charging device for an internal combustion engine or a fuel cell comprises a bearing housing, a shaft which is rotatably mounted in the bearing housing, and a compressor having a compressor wheel. Moreover, the charging device comprises a turbine according to the third aspect of the present invention. The turbine wheel and the compressor wheel coupled in a rotationally fixed manner to the shaft at opposite ends of the shaft. The charging device can be provided so as to be more robust and/or have greater longevity by virtue of providing the adjustment ring according to the first aspect of the present invention in the turbine, in particular the variable turbine geometry which comprises the charging device. This can be achieved in particular by a reduction of wear between the vane levers and the respective coupling regions. Wear on the adjustment ring and/or on the adjustment levers can be reduced in the process. Furthermore, robustness of the charging device can be increased in that each coupling region circumferentially is fully surrounded by the disk-shaped body of the adjustment ring. Moreover, a plurality of functions, such as, for example, the adjustment of the vane levers in the circumferential direction, the provision of a first detent and/or of a second detent for the adjustment of the variable turbine geometry, and/or a radial mounting of the adjustment ring in a variable turbine geometry, can be integrated in the adjustment ring as a result. Components of the charging device, in particular of the variable turbine geometry and/or of the turbine which comprises the charging device, can be dispensed with as a result of the integration of functions. In this way, costs of the charging device can be reduced.

The compressor can comprise a compressor housing in which the compressor wheel is disposed. The bearing housing can be connected to the turbine housing and the compressor housing.

In design embodiments, the charging device can comprise an electric motor which can be disposed in a motor space in the bearing housing. The turbine wheel and/or the compressor wheel can be coupled to the electric motor by way of the shaft.

According to a fifth aspect of the present invention, a method for producing an adjustment ring for a variable turbine geometry comprises the following steps:

a) providing a disk-shaped body;

b) forming a plurality of coupling regions in the disk-shaped body in such a manner that the coupling regions are spaced apart in the circumferential direction, and each coupling region is adapted for at least partially receiving a vane lever for adjusting a guide vane of a variable turbine geometry, and each coupling region circumferentially is fully surrounded by the disk-shaped body; and c) forming at least one reinforcement means on one or more of the coupling regions in such a manner that the at least one reinforcement means extends from the disk-shaped body in the axial direction and circumferentially at least partially surrounds the coupling region.

The adjustment ring here may have all design embodiments described above. When the coupling regions are coupled to the respective vane levers, a surface pressure can be reduced by means of the at least one reinforcement means on one or a plurality of the coupling regions, said surface pressure potentially arising when the vane levers are adjusted by the adjustment ring. In other words, a contact face between the vane levers and the adjustment ring, in particular the coupling regions, can be enlarged by virtue of the at least one reinforcement means. A reduction of wear between the vane lever and the coupling regions can be achieved in the process. In particular, wear on the adjustment ring and/or on the adjustment levers can be reduced. A robustness of the adjustment ring and of the variable turbine geometry which comprises the adjustment ring can thus be improved by providing the at least one reinforcement means. Furthermore, a robustness of the adjustment ring can be increased in that each coupling region circumferentially is fully surrounded by the disk-shaped body. Moreover, a plurality of functions, such as, for example, the adjustment of the vane levers in the circumferential direction, the provision of a first detent and/or of a second detent for the adjustment of the variable turbine geometry, and/or a radial mounting of the adjustment ring in a variable turbine geometry, can be integrated in the adjustment ring as a result. Moreover, further components of a variable turbine geometry can be dispensed with and costs can thus be reduced as a result of functions being integrated in the adjustment ring.

In design embodiments, the forming of at least one reinforcement means on one or a plurality of coupling regions can comprise the forming of at least one portion of the coupling region in such a manner that the portion extends in the axial direction from the disk-shaped body and circumferentially at least partially surrounds the coupling region. The forming can comprise in particular deep-drawing. A displacement of material in each coupling region can be provided by the forming process, this potentially leading to hardening of the material, in particular strain hardening, with wear resistance and/or robustness being able to be increased in this way.

In design embodiments, the forming of at least one reinforcement means on one or a plurality of coupling regions can comprise grinding the at least one formed portion in such a manner that said formed portion forms a third lateral face which is substantially parallel to a first lateral face or a second lateral face of the disk-shaped body.

In design embodiments, the method can further comprise heat treating of the adjustment ring. Stresses can be removed from the adjustment ring by means of the heat treatment.

In design embodiments, the method can furthermore comprise the compressing of the adjustment ring, in particular of the plurality of coupling regions and/or of the at least one reinforcement means and/or of the disk-shaped body. A compaction of material, in particular strain hardening, of the respective regions can be achieved as a result. Moreover, a higher strength and/or robustness of the adjustment ring, or of the respective regions, respectively, can be provided.

DETAILED DESCRIPTION

Figure 1:
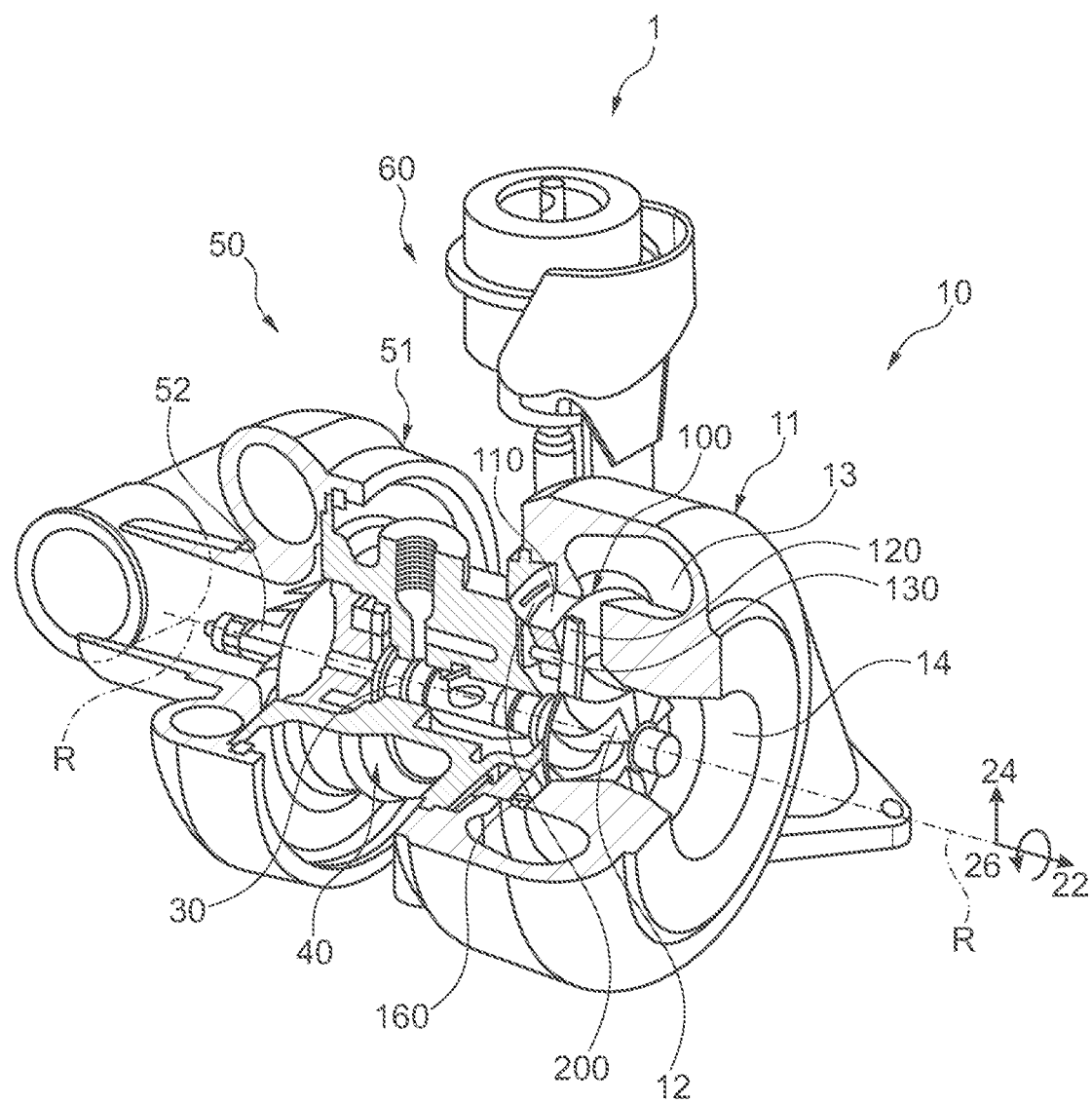
FIG. 1 shows an isometric view of an exemplary charging device having a turbine and a compressor.

In the context of this application the terms axial and axial direction relate to a rotation axis X of the shaft 30, or of the turbine wheel 12, of the rotation axis of the turbine 10, of the variable turbine geometry 100 and/or of the adjustment ring 200. With reference to the figures (see FIGS. 1 to 8B, for example), the axial direction is illustrated by the reference sign 22. A radial direction 24 here relates to the axial direction 22. A circumference, or a circumferential direction 26, respectively, here likewise relates to the axial direction 22. The directions 22 and 24 run so as to be mutually orthogonal.

FIG. 1 shows an exemplary charging device 1. In principle, the charging device 1 can be used for an internal combustion engine or a fuel cell and/or be correspondingly conceived or sized.

Figure 2:
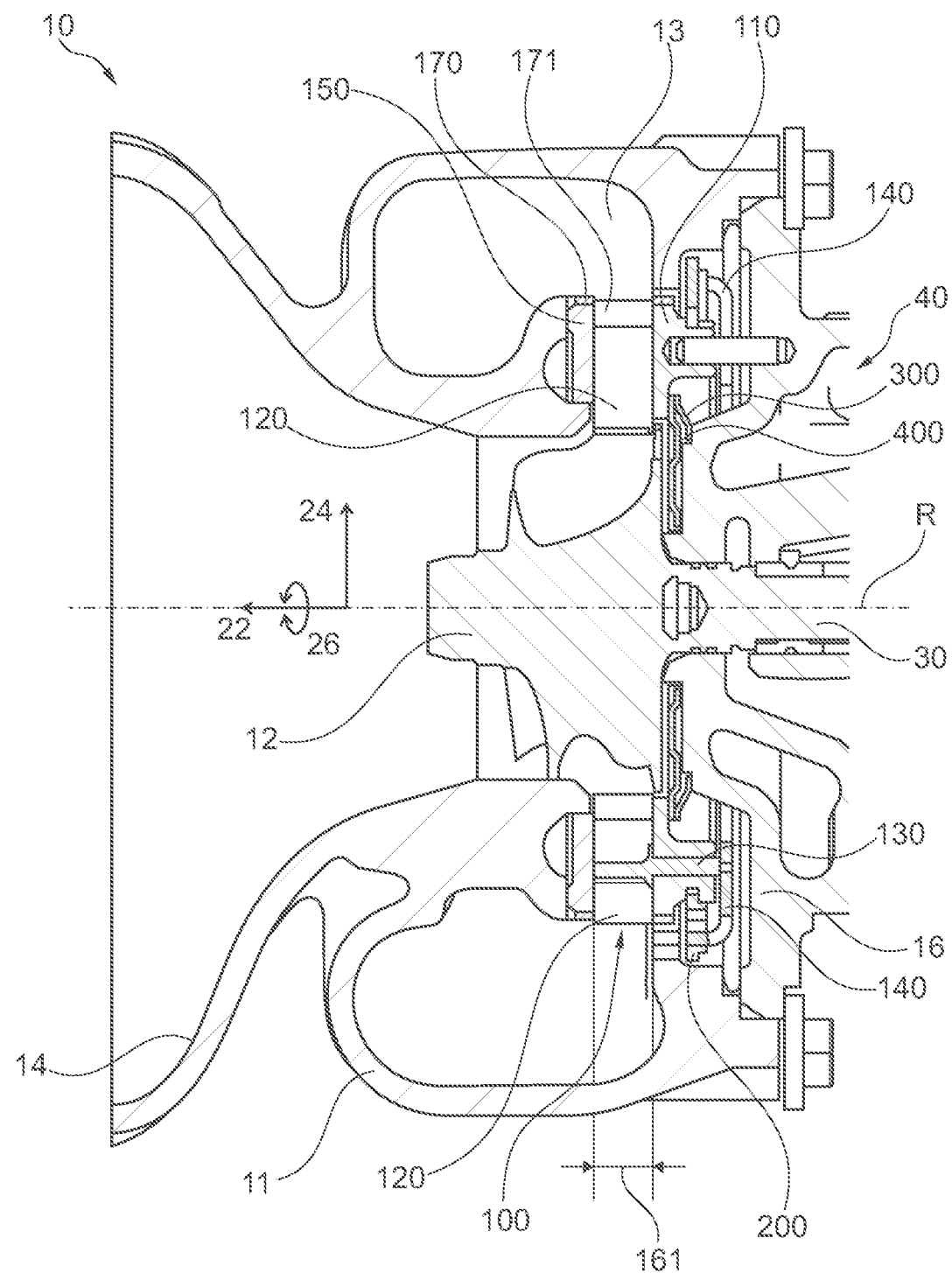
FIG. 2 shows a sectional view of the turbine having an adjustment ring according to the invention.
Figure 4:
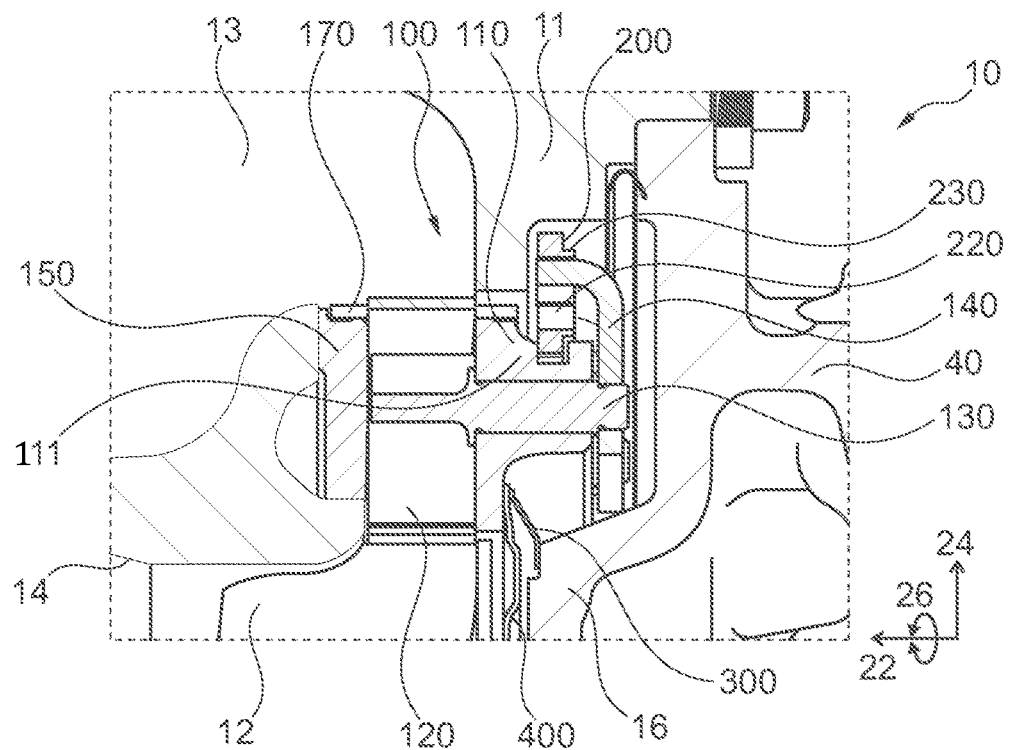
FIG. 4 shows a detailed sectional view of the turbine from FIG. 2.

As is illustrated in FIG. 1, the charging device 1 comprises a turbine 10, a bearing housing 40, a compressor 50, and an actuating installation 60. The charging device 1 here may be a turbocharger. In design embodiments, the charging device 1 can also be configured as an E-turbo (not shown in the figs.). The turbine 10 comprises a turbine housing 11 in which a turbine wheel 12 is disposed. The turbine 10 can in particular be a radial turbine. The turbine housing 11 defines a feed duct 13 and an outlet duct 14. The feed duct 13 can also be referred to as the turbine housing spiral. The turbine wheel 12 is disposed between the feed duct 13 and the outlet duct 14. The turbine 10 moreover comprises a turbine rear wall 16 which, on the side of the bearing housing, is coupled to the turbine housing 11. As can be seen in FIGS. 2 and 4, the turbine rear wall 16 can be configured as part of the bearing housing 40. With reference to FIG. 1, the charging device 1 furthermore comprises a shaft 30 having a rotation axis X which is rotatably coupled to the turbine wheel 12. The shaft 30 is rotatably mounted in the bearing housing 40. The axial direction 22 here is defined in terms of the rotation axis X. As is shown in FIG. 1, the compressor 50 comprises a compressor housing 51 in which a compressor wheel 52 is disposed. The bearing housing 40 is coupled (or connected) to the turbine housing 11. The bearing housing 40 is coupled (or connected) to the compressor housing 51. The compressor wheel 52, at an end of the shaft 30 that lies opposite the turbine wheel 12, is coupled in a rotationally fixed manner to the shaft 30. As is shown in FIG. 1, the turbine 10 comprises a variable turbine geometry (VTG) 100 having an adjustment ring 100 according to the invention, said VTG being explained in detail hereunder.

In addition to the variable turbine geometry 100, the turbine 10 can comprise an output adjustment device in the form of a waste gate flap WG (not shown in the figs.), which is provided so as to be able to close and open a waste gate of the turbine 10 when required. The waste gate flap WG here can be connected to the actuating installation 60 by way of a lever and/or a control bar.

In design embodiments, the charging device 1 can furthermore comprise an electric motor (not shown in the figs.) which can be disposed in a motor space in the bearing housing 40. The turbine wheel 12 and/or the compressor wheel 62 can be coupled to the electric motor by way of the shaft 30. The electric motor can have a rotor and a stator, in particular wherein the rotor can be disposed on the shaft 30 and wherein the stator surrounds the rotor. Furthermore, a power electronics circuit for controlling the electric motor can be disposed in a receptacle space in the bearing housing 40. The electric motor can also comprise a generator mode.

Figure 3B:
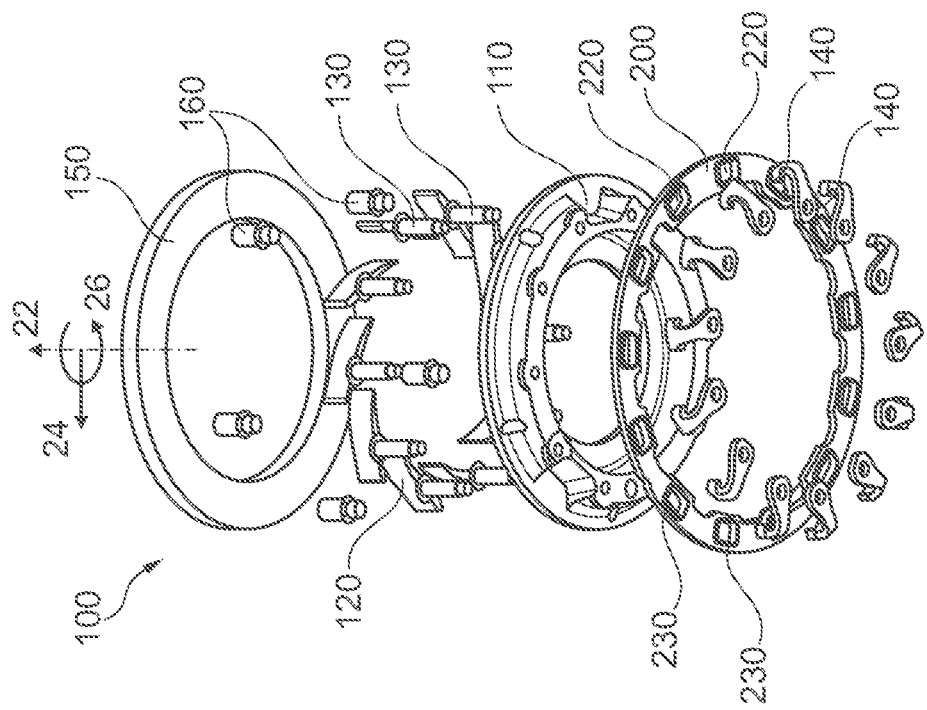
FIGS. 3A, 3B show a perspective view and an exploded view of a VTG and of an adjustment ring according to the invention.
Figure 3A:
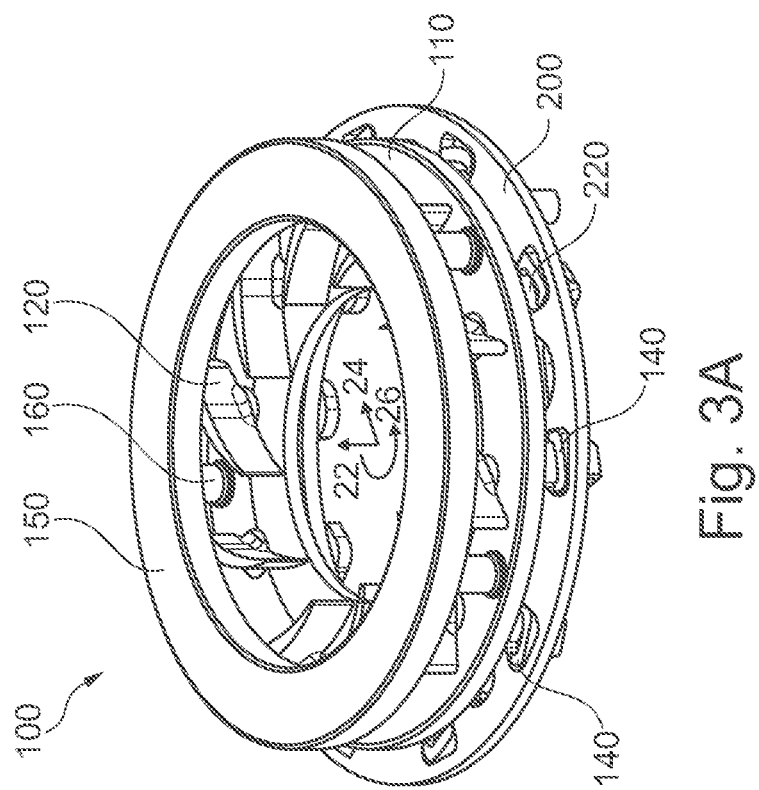

FIG. 2 shows a sectional view of the turbine 10 having a variable turbine geometry 100 and an adjustment ring 200 according to the invention. FIGS. 3A and 3B show a perspective view and an exploded view of a VTG and an adjustment ring 200 according to the invention. FIG. 4 shows a more detailed sectional view of the turbine from FIG. 2. The variable turbine geometry 100 is provided for varying an inflow to the turbine wheel 12. The variable turbine geometry 100 is disposed so as to be radially outside the turbine wheel 12, in particular wherein the variable turbine geometry 100 circumferentially surrounds the turbine wheel 12. The variable turbine geometry 100 here can be provided as a cartridge which is assembled in the turbine housing 11. In particular, the variable turbine geometry 100 can be pre-assembled as a cartridge and assembled on the turbine housing rear wall 16, in particular on the bearing housing 40, by way of at least three pins, which are uniformly spaced apart in the circumferential direction 26.

As is shown in FIGS. 2 to 4, the variable turbine geometry 100 comprises a vane bearing ring 100. Moreover, the variable turbine geometry 100 comprises a plurality of adjustable guide vanes 120. The guide vanes 120 are adjustable between a first position, in particular a first terminal position, and a second position, in particular a second terminal position. A plurality of intermediate positions can be adjusted between the first and the second position. The first position corresponds to a position of the variable turbine geometry 100 opened to the maximum. The second position corresponds to a position of the variable turbine geometry 100 opened to the minimum. As a result, a fluid flow from the feed duct 13 can be directed variably through a flow duct, thus where the guide vanes 120 are disposed, onto the turbine wheel 12. Nozzle cross sections (also referred to as intermediate duct), which may be larger or smaller depending on the current position of the adjustable guide vanes 120 and correspondingly impinge the turbine wheel 12 mounted on the rotation axis R with more or less fluid of an internal combustion engine (e.g. exhaust gas) or of a fuel cell, so as to drive, by way of the turbine wheel 12, a compressor wheel 52 that sits on the same shaft 30, are formed between adjacent guide vanes 120. The guide vanes 120 have in each case a leading edge and a trailing edge. The guide vanes 120 have in each case a vane length between the leading edge and the trailing edge. The vane length can be understood to be the distance between the leading edge and the trailing edge. The leading edge can be understood to be an incident flow region of the guide vane with a maximum distance from the vane axis. The trailing edge can be understood to be an outflow region of the guide vane with a maximum distance from the vane axis. In other words, the trailing edge, when viewed in the flow direction along the guide vane, is located downstream of the leading edge. A position of the guide vanes 120 can also be referred to as a position or operating position, or operational position, respectively. This enables any possible position of a guide vane 120 during the operation of the turbine 10 between the first position, at the maximum throughput/flow cross section (thus open to the maximum), and the second position, at the minimum throughput/flow cross section (thus open to the minimum, or closed to the maximum, respectively). Any "possible position" can be understood to be the positions that may be provided during operation. It is known to the person skilled in the art that the operating positions change variably and automatically during the operation of the turbine 10.

In order for the movement, or the position, of the guide vanes 120 to be controlled, an actuating installation 60, which per se can be of an arbitrary configuration, for example electronic or pneumatic, to mention only a few examples, can be provided. The actuating installation 60 can be an actuator. In the example of FIG. 1, the actuating installation 60 is configured so as to be pneumatic, having a control housing (for example a pressure cell) and a tappet element which transmits the movement of the control housing to the variable turbine geometry 100, or the guide vanes 120, respectively, in particular by way of an adjustment shaft assembly.

As is likewise shown in FIGS. 2 to 4, the variable turbine geometry 100 comprises an adjustment ring 200. The plurality of adjustable guide vanes 120 here are adjustable between the first position and the second position by means of a movement of the adjustment ring 200 in the circumferential direction 26. The actuating installation 60 is in particular operatively coupled to the adjustment ring 200 and adapted for moving the adjustment ring 200 in the circumferential direction 26. The actuating installation 60 is coupled to the adjustment ring 200 by way of one or more levers and/or a control bar. The plurality of guide vanes 120 are in each case rotatably mounted in the vane bearing ring 110 by way of a vane shaft 130. In other words, the guide vanes 120 are rotatably mounted in the vane bearing ring 120 and can be rotated or adjusted by way of the adjustment ring 200. In particular, the adjustable guide vanes 120 are rotatably mounted in the vane bearing ring 110 by way of the vane shafts 130 so as to be uniformly distributed in the circumferential direction 26. The vane shafts 130 here extend in the axial direction 22, thus parallel to the rotation axis R. In other words, the guide vanes 120 are rotatably mounted in the vane bearing ring 110 along a respective vane axis. An odd number of guide vanes 120 can be provided. More than eight guide vanes, in particular more than ten guide vanes, preferably more than 12 guide vanes can be provided. In other design embodiments, an even number of guide vanes 120 can be provided.

Each guide vane 130 of the plurality of adjustable guide vanes 120 is in each case connected in a rotationally fixed manner to a vane lever 140. Each vane lever 140 is in each case at least partially received in a coupling region 220 of the adjustment ring 200 for adjusting the respective guide vane 120. In other words, the vane levers 140 are operatively coupled to the adjustment ring 200. The guide vanes 120 can be adjusted in a rotation of the adjustment ring 200 in the circumferential direction 26. The precise coupling between the adjustment ring 200 and the guide vanes 120 will be explained in detail hereunder. The guide vanes 120 are in each case connected in a rotationally fixed manner to the vane shaft 130 at a first end of the vane shaft 130. The vane lever 140 is connected to the vane shaft 130 at a second end of the vane shaft 130, opposite the first end. In design embodiments, the respective guide vane 120 can be configured so as to be integral to the vane shaft 130. Each vane lever 140 can have a radial vane lever portion 141 which extends radially from the vane shaft 130. Moreover, each vane lever 140 can have an axial vane lever portion 142 which extends axially toward the adjustment ring 200 from the radial vane lever portion 141. In particular, the axial vane lever portion 142 can extend axially at least partially into the respective coupling region 220. The axial vane lever portion 142, from the radial vane lever portion 141, can extend predominantly parallel to the vane shaft 130 here. As is shown in the figs., the vane levers 140 and the guide vanes 122 can be disposed on opposite sides of the vane bearing ring 110.

As is shown in FIGS. 2 to 4, the variable turbine geometry 100 can comprise a cover disk 150 which is disposed so as to be parallel to the vane bearing ring 110. The plurality of adjustable guide vanes 120 can be disposed between the cover disk 150 and the vane bearing ring 120. Alternatively, however, the cover disk 150 may also not be provided. The variable turbine geometry 100 can moreover comprise a plurality of spacer elements 160 which are disposed on the vane bearing ring 110 so as to be distributed in the circumferential direction 26 in such a manner that they define an axial spacing 161 of the vane bearing ring 110 from the cover disk 150 (see FIGS. 2, 3A and 3B). In particular, the plurality of spacer elements 160 can comprise at least three spacer elements 10. In design embodiments, the cover disk 150 may also not be provided and the plurality of spacer elements 160 can define an axial spacing 161 from a portion in the turbine housing 11 that axially lies opposite the vane bearing ring 110. A minimum clearance for the adjustment of the guide vanes 120 can be ensured by the spacer elements 160.

As is indicated in FIGS. 2 and 4, the variable turbine geometry 100 can furthermore comprise an upstream guide grid 170 which circumferentially surrounds the vane bearing ring 110 and/or the plurality of adjustable guide vanes 120. The upstream guide grid 170 can have a plurality of fixed upstream guide vanes 171. The fixed upstream guide vanes 171 can in each case be disposed between two adjacent adjustable guide vanes 120, in particular within an external circumference of the variable turbine geometry 100. The fixed upstream guide vanes 171 here are provided with a fixed angle of attack. In other words, the upstream guide vanes 171 are not rotatable or adjustable, respectively. The upstream guide grid 170 can also replace the spacer elements 160 and ensure the axial spacing 161 between the vane bearing ring 110 and the cover disk 150 (or a portion of the turbine housing 12). An improved incident flow of the guide vanes 120 and/or of the turbine wheel 12 can be provided by the upstream guide grid 170.

As has already been described above, the variable turbine geometry 100 has an adjustment ring 200. FIGS. 5 to 8B show different design embodiments of the adjustment ring 200 according to the invention. As is shown in the figs., the adjustment ring 200 comprises a disk-shaped body 210 and one or more coupling regions 220 which are formed in the disk-shaped body 210. The adjustment ring 200, in particular the disk-shaped body 210, can have an internal diameter d1 and an external diameter d2. In other words, the disk-shaped body 210 can be of a ring-shaped design. The coupling regions 220 are spaced apart in the circumferential direction 26 (see FIG. 5). Each coupling region 220 is adapted for at the least partially receiving a vane lever 140 for adjusting a guide vane 120 of a variable turbine geometry 100. As is shown in FIGS. 4, 6A and 6B, each vane lever 140 is in each case at least partially received in a coupling region 220 for adjusting the respective guide vane 120. In other words, the respective vane levers 140 engage in each case with a coupling region 220 such that, in the event of a movement of the adjustment ring 200, in particular in the circumferential direction 26, this movement can be transmitted to the vane levers 140 and thus to the adjustable guide vanes 120. In particular, a rotation of the adjustment ring 200 in the circumferential direction 26 leads to a rotation of the respective guide vanes 120 about the respective vane axis thereof, and in particular to an adjustment of the respective guide vanes 120 between the first position and the second position. In the design embodiments shown, "partially received" means that the respective vane lever 140 extends in the respective coupling region 220, in particular in the axial direction 22, in such a manner that a transmission of force between the adjustment ring 200 and the vane levers 140 can take place in the event of a movement of the adjustment ring 200 in the circumferential direction 26.

Figure 5:
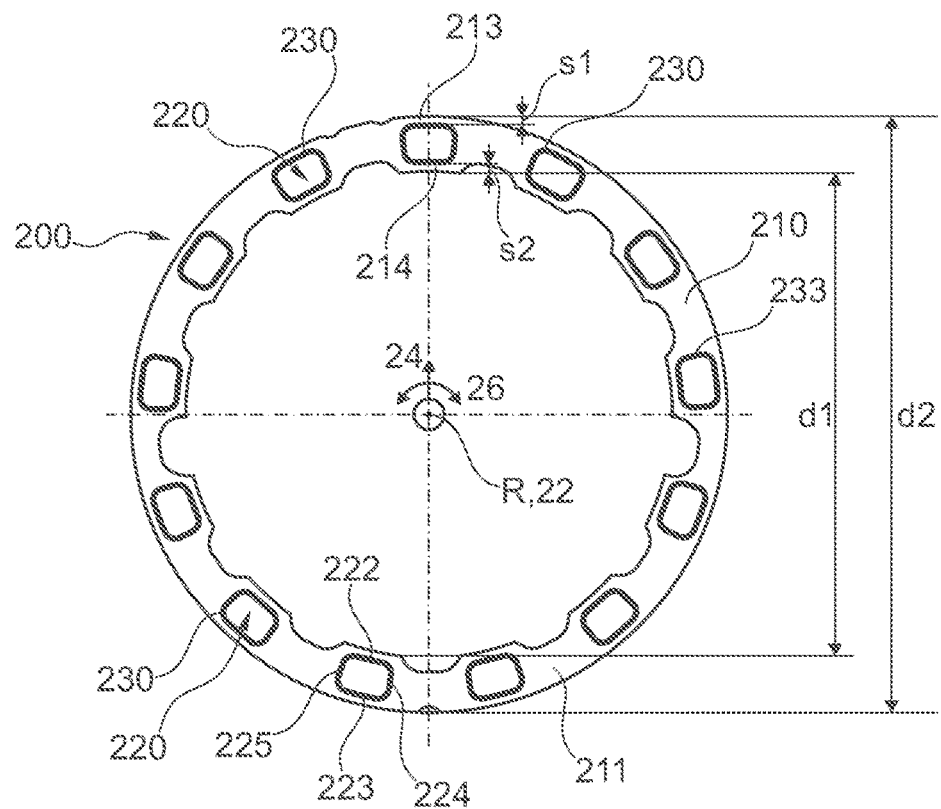
FIG. 5 shows a front view of the adjustment ring according to the invention and according to a first design embodiment.
Figure 6A:
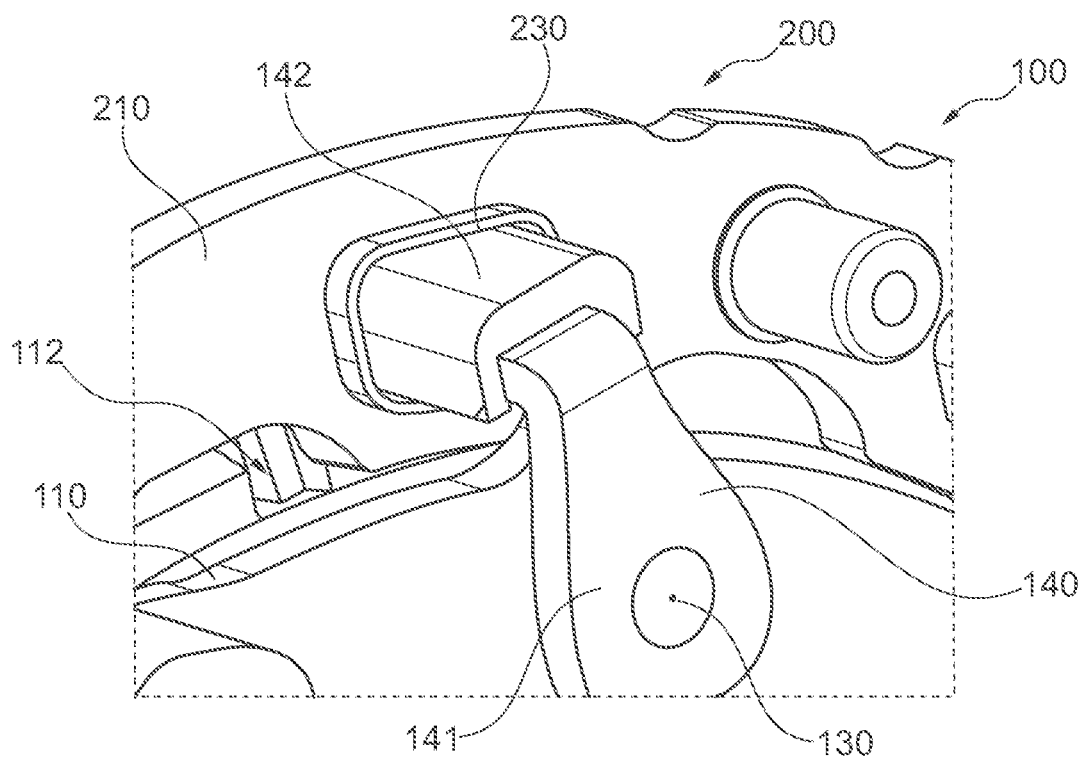
FIGS. 6A, 6B show a perspective view and a detailed sectional view of a VTG having an adjustment ring according to the invention.
Figure 6B:
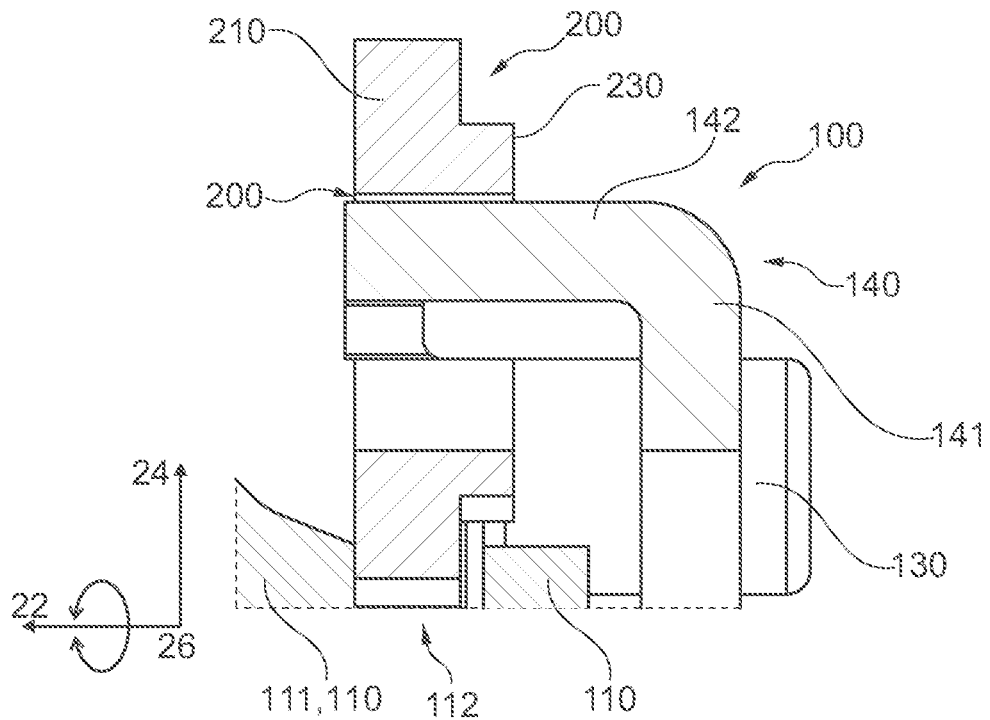

Each coupling region 220 circumferentially is fully surrounded by the disk-shaped body 210 (see FIG. 5, for example). In other words, each coupling region 220 has an encircling wall 221 which surrounds the respective coupling region 220. In particular, the respective coupling region 220 in the adjustment ring 200 extends in the axial direction 22. The respective encircling wall 221 here is defined by the disk-shaped body 210 in the region of each coupling region 220. As can be seen in FIGS. 6A and 6B, the disk-shaped body 210 has, on one or more coupling regions 220, at least one reinforcement means 230 which extends in the axial direction 22 from the disk-shaped body 210 and circumferentially at least partially surrounds the coupling region 220. When the coupling regions 220 are coupled to the respective vane levers 140, a surface pressure can be reduced by means of the at least one reinforcement means 230 on one or more of the coupling regions 220, said surface pressure potentially arising when the vane levers 140 are adjusted by the adjustment ring 200, in particular in a movement in the circumferential direction 26 relative to the vane bearing ring 110. In other words, a contact face between the vane levers 140 and the adjustment ring 200, in particular in the coupling regions 220, can be enlarged by virtue of the at least one reinforcement means 230 on one or more of the coupling regions 220. A reduction of wear between the vane levers 140 and the coupling regions 220 can be achieved in the process. In particular, wear on the adjustment ring 200 and/or on the adjustment levers 140 can be reduced. A robustness of the adjustment ring 200 and of the variable turbine geometry 100 which comprises the adjustment ring 200 can therefore be improved by providing the at least one reinforcement means 230. Furthermore, a robustness of the adjustment ring 200 can be increased in that each coupling region 220 circumferentially is fully surrounded by the disk-shaped body 110. Moreover, a plurality of functions, such as, for example, the adjustment of the vane levers 140 in the circumferential direction 26, the provision of a first detent for the first position (see above) and/or of a second detent for the second position (see above) for the adjustment of the variable turbine geometry 100, and a radial mounting 112 of the adjustment ring 200 in the variable turbine geometry, can be integrated in the adjustment ring 200 as a result. Moreover, further components of a variable turbine geometry 100 can be dispensed with and costs can thus be reduced as a result of functions being integrated in the adjustment ring 200.

As is shown in FIG. 3B, for example, the adjustment ring 200, in particular the disk-shaped body 210, can have the at least one reinforcement means 230 on each coupling region 220 of the plurality of coupling regions 220. In other words, a surface pressure can be reduced, or a contact face increased, respectively, on each coupling region 220. Moreover, the adjustment ring 200 can be designed so as to be even more robust and more stable in this way. As is shown in FIGS. 3B and 4 to 8B, each coupling region 220 can be configured as a passage in the disk-shaped body 210. In particular, the disk-shaped body 210 has a first lateral face 211 and a second lateral face 212. Here, each passage can fully in the disk-shaped body 110 from the first lateral face 211 to the second lateral face 212, in particular in the axial direction 22.

As is shown in the design embodiments of FIGS. 2 to 8B, the at least one reinforcement means 230 can be configured so as to be integral to the disk-shaped body 210. In other design embodiments, the at least one reinforcement means 230 can be provided as a separate component and be connected to the disk-shaped body 210. In particular, the at least one reinforcement means 230 can be fixedly connected to the disk-shaped body 110. For example, the at least one reinforcement means 230 can be connected in a materially integral manner (e.g. by welding, soldering/brazing and/or adhesive bonding) and/or in a form-fitting and/or force-fitting manner to the disk-shaped body 210. If the at least one reinforcement means 230 is connected to the disk-shaped body 210 in a form-fitting and/or force-fitting manner, the at least one reinforcement means 230 can also be designed so as to be interchangeable. In design embodiments, the at least one reinforcement means 230 can be applied to the disk-shaped body 110 by metal-injection molding (MIM).

As is shown in FIGS. 2 to 8B, the at least one reinforcement means 230 can be configured so as to be collar-shaped. Collar-shaped means that the at least one reinforcement means 230 extends in the axial direction 22 from the disk-shaped body 110 and at least partially encloses (or surrounds) the respective coupling region. Consequently, the at least one reinforcement means 230 can be configured as an additional wall about the respective coupling region 220.

As has already been described above, each coupling region 220, in particular each passage, has an encircling wall 221. In particular, the disk-shaped body 110 in the region of each coupling region 220 forms the encircling wall 221. In other words, each coupling region 220, in particular each passage, can have an internal circumferential face (see FIGS. 5 to 8B). As can best be seen in FIGS. and 7 to 8B, the encircling wall 221 has a radially inner wall portion 222 and a radially outer wall portion 223 which extend substantially tangentially and/or in the circumferential direction 26. Moreover, the encircling wall 221 has a first lateral wall portion 224 and a second lateral wall portion 225 which extend substantially in the radial direction 24. In a movement of the adjustment ring 200 in the circumferential direction 26 relative to the vane bearing ring 110, the plurality of guide vanes 120 can be adjusted by means of the two lateral wall portions 224, 225. The radially inner wall portion 222 can provide the first detent for the first position which corresponds to a position of the variable turbine geometry 100 opened to the maximum. In particular, the first detent can be provided on a first sub-region of the radially inner wall portion 222. Moreover, the radially inner wall portion 222 can provide the second detent for the second position which corresponds to a position of the variable turbine geometry 100 opened to the minimum. In particular, the second detent can be provided on a second sub-region of the radially inner wall portion 222. More specifically, in the event of an adjustment of the adjustment ring 200 in the circumferential direction 26, as from a specific adjustment angle (in the clockwise direction or the counter-clockwise direction), measured in terms of the rotation axis R between the first position and the second position, the respective vane lever 140 can come into contact with the inner wall portion 222 in the coupling region 220. In this way, any further adjustment of the plurality of guide vanes 140 in the circumferential direction 26 can be restricted. For example, in the first position, the first sub-region can be disposed on a right side of the inner wall portion 222 in terms of the rotation axis R (see FIG. 5, for example). In the first position, the vane lever 140 as from a specific adjustment angle can come into contact with the first sub-region and in this way impede (or restrict) any further adjustment of the plurality of guide vanes 120 in the clockwise direction. For example, in the second position, the second sub-region can be disposed on a left side of the inner wall portion 222 in terms of the rotation axis R. In the second position, the vane lever 140 as from a specific adjustment angle can come into contact with the second sub-region and in this way impede (or restrict) any further adjustment in the counter-clockwise direction. The above-described features here relate to a plan view onto the first lateral face 211, as illustrated in FIGS. 5 and 6A. Moreover, a radial mounting 112 of the adjustment ring 200 can take place by way of the vane levers 140 (in particular on an external side of the axial vane lever portion 142 in terms of the rotation axis R) rolling on the radially outer wall portion 221. In other words, a radial roller bearing between the respective axial vane lever portions 142 and the respective radially outer wall portions 221 can be provided in this way. This can be seen in FIG. 4, for example, wherein the adjustment ring 200 in the coupling region 220 in the radial direction 24 bears on the vane lever 140. An axial mounting of the adjustment ring 200 can take place by way of the vane bearing ring 110. In particular, the vane bearing ring 110, on a side 111 that faces away from the plurality of adjustable guide vanes 120 can have a mounting 112 for axially mounting the adjustment ring 200. The adjustment ring 200 can be disposed so as to be predominantly radially outside the vane bearing ring 110 (see FIGS. 4, 6A and 6B, for example).

Figure 7:
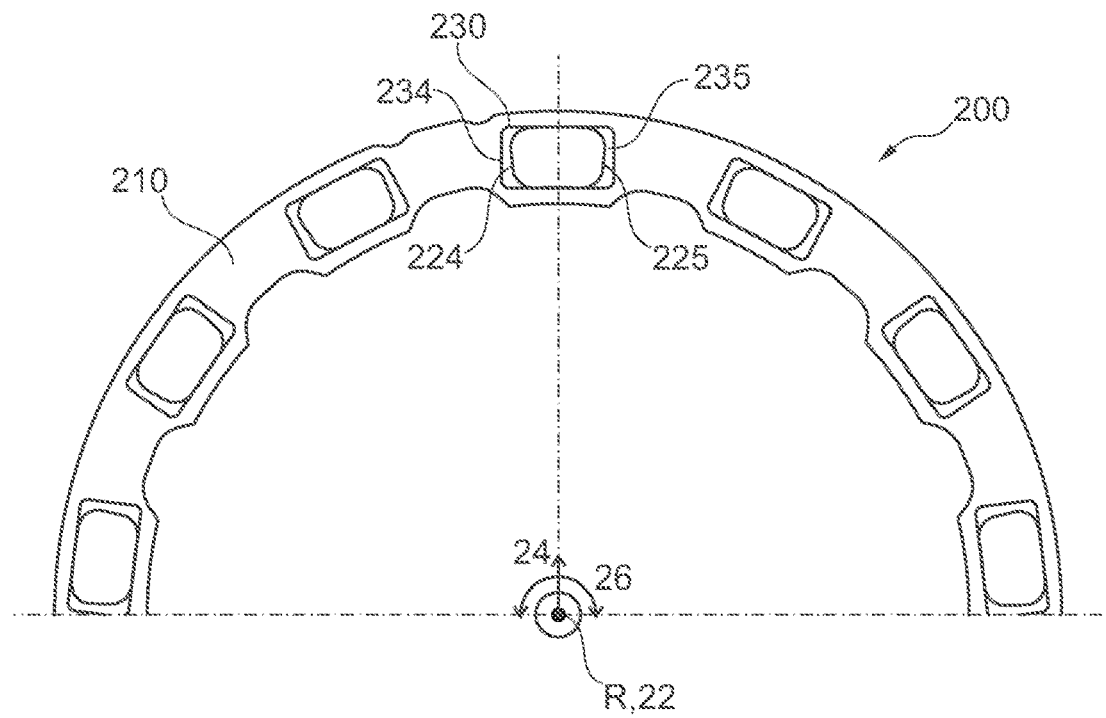
FIG. 7 shows a front view of the adjustment ring according to the invention and according to a second design embodiment.

According to the design embodiment of the adjustment ring 200 of FIG. 7, the at least one reinforcement means 230 can have a first reinforcement portion 234 and at least one second reinforcement portion 235. The first reinforcement portion 234 can surround the first lateral wall portion 224. The at least one second reinforcement portion 235 can surround the second lateral wall portion 225. Wear can arise in particular between the two lateral wall portions 224, 225 and the vane lever 140, in particular in the respective coupling regions 220, because the transmission of force between the adjustment ring 200 and the vane lever 140 substantially takes place here. In the design embodiment of FIG. 7, the at least one reinforcement means 230 does not surround the radially inner wall portion 222 and the radially outer wall portion 221. Of course, the at least one reinforcement means 230 can however likewise surround the radially inner wall portion 222 and/or the radially outer wall portion 221. As is shown in FIG. 5, for example, the at least one reinforcement means 230 in a preferred design embodiment can circumferentially fully surround the coupling region 220, in particular the respective coupling region 220 which has the at least one reinforcement means 230. As has already been described above, in this way each coupling region 220 can have the at least one reinforcement means 230.

In design embodiments, a surface coating can moreover be provided in addition to the at least one reinforcement means 230 in one or several or the plurality of coupling regions 220. In design embodiments, the surface coating can be provided in all coupling regions 220. In particular, the surface coating can be provided on the encircling wall 221 and/or an internal face of the at least one reinforcement means 230 (i.e. a face of the at least one reinforcement means 230 that is adjacent to the encircling wall 221 or faces the latter, respectively). A targeted surface coating and/or treatment can be provided here in the respective coupling regions, in particular the encircling wall 221 and/or an internal face of the at least one reinforcement means 230. As a result, tribological properties between the vane levers 140 and the coupling regions 220 can be improved. An improved wear resistance and/or robustness of the adjustment ring 200 and of the vane levers 140 can be achieved in particular.

Figure 8A:
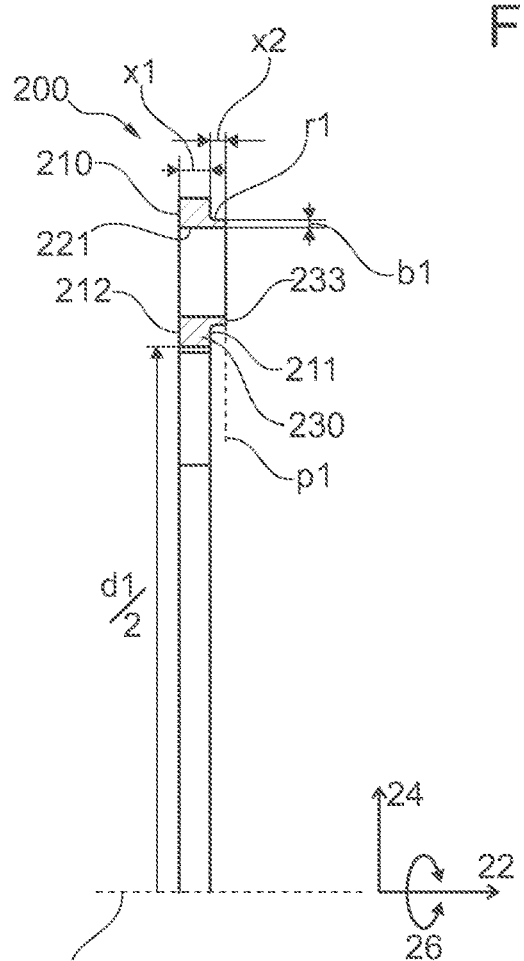
FIGS. 8A, 8B show sectional views of the adjustment ring according to the invention, having different disposals of the at least one reinforcement means.
Figure 8B:
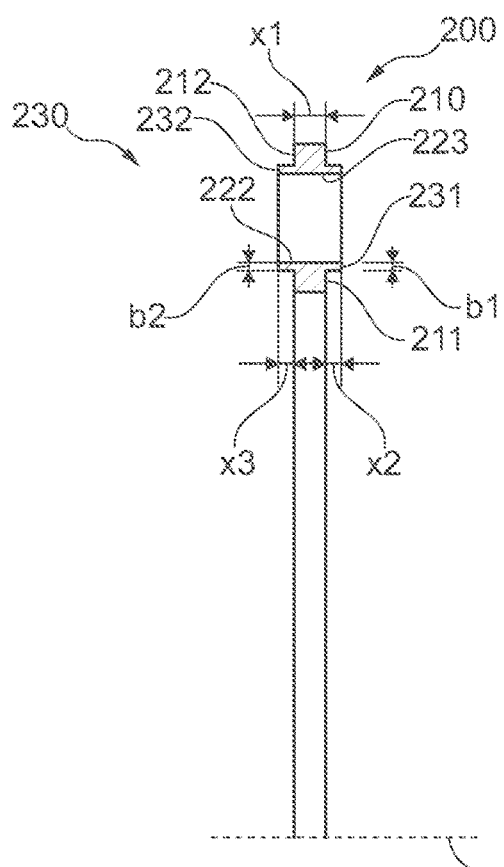

As is shown in FIGS. 8A and 8B, the at least one reinforcement means 230 can extend from the first lateral face 211 and/or from the second lateral face 212. FIG. 8A represents a sectional illustration of the adjustment ring 200 of the design embodiment of the adjustment ring 200 according to FIGS. 2 to 6B. The at least one reinforcement means 220 on the respective coupling regions 220 can in particular extend from the first lateral face 211. The first lateral face 211 here is provided on a side that faces the vane lever 140. Consequently, the at least one reinforcement means 230 in this embodiment can extend toward the vane lever 140, in particular toward the radial vane lever portion 141. In this way, the at least one reinforcement means 230, in the assembled state of the variable turbine geometry 100, can extend toward the turbine rear wall 16. In design embodiments, the at least one reinforcement means 230 on the respective coupling regions 220 can extend from the second lateral face 211. The second lateral face 212 is in particular provided on a side that faces away from the vane lever 140. Consequently, the at least one reinforcement means 230 in this embodiment can extend away from the vane lever 140, in particular extend away from the radial vane lever portion 141. In this way, the at least one reinforcement means 230, in the assembled state of the variable turbine geometry 100, can extend away from the turbine rear wall 16, that is to say in the axial direction 22 toward the plurality of guide vanes 140. As is shown in FIG. 8A, the at least one reinforcement means 230 in the axial direction 22 extends up to an axial distance x2 measured in the axial direction 22. In particular, the at least one reinforcement means 230 can extend up to a plane p1 which can be disposed so as to be parallel to the first lateral face 211 or to the second lateral face 212. The axial distance x2 can be measured between the plane p1 and the first lateral face 211 or the second lateral face 212. The disk-shaped body 210 of the adjustment ring 200 has a body thickness x1 measured in the axial direction 22. In design embodiments, the body thickness of the adjustment ring 200 can be designed in such a manner that said body thickness is suitable for fine-blanking of the adjustment ring 200. In design embodiments, the body thickness can be less than 5 mm. in design embodiments, a ratio of the axial distance x2 to the body thickness x1 can be between 0.25 and 1.0, in particular between 0.40 and 0.70, preferably between 0.45 and 0.60. By means of this ratio, the at least one reinforcement means 230 can reduce a surface pressure between the vane levers 140 and the adjustment ring 200 and increase the robustness of the adjustment ring 200, of the vane levers 140 and/or of the variable turbine geometry 100. As is shown in FIG. 8A, the at least one reinforcement means 230 has a minimum width b1, in particular measured in the radial direction 24. The minimum width b1 can in particular be measured between an internal circumference and an external circumference of the at least one reinforcement means 230. A ratio of the minimum width b1 to the body thickness x1 can be between 0.10 and 0.70, in particular between 0.15 and 0.50, preferably between 0.20 and 0.35. By means of this ratio, a stability, robustness and/or longevity of the at least one reinforcement means 230 and of the adjustment ring 200 can be guaranteed. The at least one reinforcement means 230, between a side that faces away from the coupling region 220 and the first lateral face 211 (if the at least one reinforcement means 230 extends from the first lateral face 211), or the second lateral face 212 (if the at least one reinforcement means 230 extends from the second lateral face 212) can be designed so as to be radiused. The radiused feature can have a radius r1. Tension peaks can be reduced or avoided by means of the radius r1. In particular, the at least one reinforcement means 230 can have a third lateral face 233, in particular wherein the third lateral face 233 can run so as to be substantially parallel to the first lateral face 211 (if the at least one reinforcement means 230 extends from the first lateral face 211) and/or to the second lateral face 212 (if the at least one reinforcement means 230 extends from the first lateral face 211). The plane p1 can in particular be defined on the third lateral face 233. The radiused feature can be provided between the third lateral face 233 and the first lateral face 211 and/or the second lateral face 212.

As is shown in FIG. 8B, a combination of the features described above can also be provided, in particular wherein the at least one reinforcement means 230 extends from the first lateral face 211 and from the second lateral face 212. This can lead to a further enlarged contact face and to a lower surface pressure. Moreover, the robustness and/or stability of the adjustment ring 200 can be improved in this way, and wear between the vane levers 140 and the coupling regions 220, in particular the disk-shaped body 210, can be reduced. More specifically, the at least one reinforcement means 230 can comprise a first reinforcement means 231 and a second reinforcement means 232 (see FIG. 8). The first reinforcement means 231 can extend from the first lateral face 211, and the second reinforcement means 232 can extend from the second lateral face 212. The axial distance x2 can be a first axial distance. In design embodiments, the first reinforcement means 231 can extend up to the first axial distance x2, and the second reinforcement means 232 can extend up to a second axial distance x3. The second axial distance x2 here can be measured in the axial direction 22. The minimum width b1 can be a first minimum width. In design embodiments, the first reinforcement means 231 can extend up to the first minimum width b1, and the second reinforcement means 232 can extend up to a second minimum width b2. The second minimum width b2 can be measured in the radial direction 24. The second minimum width b2 can in particular be measured between an internal circumference and an external circumference of the second reinforcement means 232. In design embodiments, the first axial distance x1 and the second axial distance x2 can be of identical size. In other design embodiments, the first axial distance x2 can be larger or smaller than the second axial distance x3. In design embodiments, the first minimum width b1 and the second minimum width b2 can be of identical size. In other design embodiments, the first minimum width b1 can be larger or smaller than the second minimum width b2. The reinforcement portions 234, 235 (as described above) can also extend up to the respective axial distances x2, x3, which may be of identical size or of different sizes. The reinforcement portions 234, 235 can in each case also have minimum widths b1, b2 which may be of identical size or of different sizes.

As can be seen in FIGS. 5 and 6A, the disk-shaped body 210 in the region of each coupling location 220 has a radially outer web 213 and a radially inner web 214. The radially outer web 213 here can define a first web width s1. The radially inner web 214 can define a second web width s2. The first and the second web widths s1, s2 can in each case be measured in the radial direction 24. The first and the second web widths s1, s2 can be of identical size or of different sizes. If the at least one reinforcement means 230 is provided between the respective coupling region 220, in particular the passage, and the external diameter d2, the first web width s1 can be measured in the radial direction 24, between the at least one reinforcement means 230 and the external diameter d2. If the at least one reinforcement means 230 is provided between the coupling region 220, in particular the passage and the internal diameter d1, the second web width s2 can be measured in the radial direction 24, between the at least one reinforcement means 230 and the internal diameter d2. If the at least one reinforcement means 230 is not provided on the radially outer wall portion 223 and/or on the radially inner wall portion 222, the first web width s1 can be measured between the coupling region 220, in particular the radially outer wall portion 223, and the external diameter d2, and/or the second web width s2 can be measured between the coupling region 220, in particular the radially inner wall portion 222, and the internal diameter d1. A ratio of the first web width s1 and/or the second web width s2 to the body thickness x1 can be between 0.15 and 0.60, in particular between 0.20 and 0.50, preferably between 0.25 and 0.35. As a result, a robustness, stability and/or longevity of the disk-shaped body 210, in particular of the adjustment ring 200, can be provided.

As is shown in FIGS. 2 and 4, for example, the turbine 10 can comprise a bracing means 300 which, in the axial direction 22, is disposed between the variable turbine geometry 10, in particular the vane bearing ring 110, and the turbine rear wall 16. The bracing means 300 can be adapted for bracing the variable turbine geometry 100 in relation to the turbine housing 11, in particular in the axial direction 22. The bracing means 300 can be configured as a plate spring. The bracing means 300 has a radially outer end and a radially inner end. The bracing means 300 on the radially outer end thereof can bear on the vane bearing ring 110, and on the radially inner end thereof bear on the turbine rear wall 16. Moreover, the turbine 10 can comprise a heat shield 400. A thermal transfer from the turbine 10 to the bearing housing 40 and/or to the compressor 50 can be reduced by the heat shield 400. The heat shield 100 in the radial direction 22 can be disposed between the turbine wheel 12 and the bearing housing 40, in particular between the variable turbine geometry 100 and the bearing housing 40. More specifically, the heat shield 400 can be clamped between the bracing means 300 and the vane bearing ring 110. In particular, the heat shield 400 can be clamped between the vane bearing ring 110 and the radially outer end of the bracing means 300. The bracing means 300 by way of the heat shield 400 can bear on the vane bearing ring 110 so as to be in indirect contact with the latter. The bracing means 300, conjointly with the bearing housing 40, can form a linear contact, and conjointly with the heat shield 400, in particular on the radially outer end of the latter, can form a planar contact. In alternative design embodiments, however, the bracing means 300 can also bear on the vane bearing ring 110 so as to be in direct contact with the latter. By means of the spacer elements 160 and/or of the upstream guide grid 170, the pre-tensioning force generated by the bracing means 300, can be transmitted axially from the vane bearing ring 110 to the turbine housing 11, or if present, to the cover disk 150.

According to a further aspect of the present invention, a method for producing an adjustment ring 200 for a variable turbine geometry 100 comprises the following steps:

a) providing a disk-shaped body 210;

b) forming one or more coupling regions 220 in the disk-shaped body 210 in such a manner that the coupling regions 220 are spaced apart in the circumferential direction 26, and each coupling region 220 is adapted for at least partially receiving a vane lever 140 for adjusting a guide vane 120 of a variable turbine geometry 100, and each coupling region 220 circumferentially is fully surrounded by the disk-shaped body 210;

c) forming at least one reinforcement means 230 on one or one or more coupling regions 220 in such a manner that the at least one reinforcement means 230 extends from the disk-shaped body 210 in the axial direction 22 and circumferentially at least partially surrounds the coupling region 220.

The adjustment ring 200 produced by the method may have all design embodiments described above. When the coupling regions 220 are coupled to the respective vane levers 140, a surface pressure can be reduced by means of the at least one reinforcement means 230 on one or more of the coupling regions 220, said surface pressure potentially arising when the vane levers 140 are adjusted by the adjustment ring 200. In other words, a contact face between the vane levers 140 and the adjustment ring 200, in particular the coupling regions 220, can be enlarged by virtue of the at least one reinforcement means 230. A reduction of wear between the vane levers 140 and the coupling regions 220 can be achieved in the process. In particular, wear on the adjustment ring 200 and/or on the adjustment levers 140 can be reduced. A robustness of the adjustment ring 200 and of the variable turbine geometry 100 which comprises the adjustment ring 200 can be improved by providing the at least one reinforcement means 230. Furthermore, a robustness of the adjustment ring 200 can be increased in that each coupling region circumferentially is fully surrounded by the disk-shaped body 210. Moreover, a plurality of functions, such as, for example, the adjustment of the vane levers 140 in the circumferential direction 26, the provision of a first detent and/or of a second detent for the adjustment of the variable turbine geometry, and/or a radial mounting of the adjustment ring 200 in the variable turbine geometry 100, can be integrated in the adjustment ring 200 as a result. Moreover, further components of a variable turbine geometry 100 can be dispensed with and costs can thus be reduced as a result of functions being integrated in the adjustment ring 200.

The at least one reinforcement means 230 can be provided by a forming process. In design embodiments, the forming of at least one reinforcement means 230 on one or more coupling regions 220 can comprise the forming of at least one portion of the coupling region 220 in such a manner that the portion extends in the axial direction 22 from the disk-shaped body 210 and circumferentially at least partially surrounds the coupling region 220. The forming can in particular comprise deep-drawing. As a result of the forming process, a displacement of material in the respective coupling regions 220 can be provided, this potentially leading to hardening of the material, in particular strain hardening, with a wear resistance and/or robustness of the adjustment ring 200 thus being able to be increased. A production-related increased strength in comparison to the basic material of the adjustment ring 200 and/or a high surface finish can be achieved in particular in the region of each coupling region 220, in particular of the encircling wall 221. This can be provided in particular by the forming process and/or the surface coating. Reduced friction and/or reduced wear between the adjustment ring 200 and the vane levers 140 can be provided during the operation of the adjustment ring 200 as a result. Moreover, post-machining (e.g. by grinding) of the respective coupling regions 220 and/or of the at least one reinforcement means 230 can be reduced by the forming process, this in turn potentially leading to reduced costs. The coupling regions 220 can be provided by punching in the disk-shaped body 210. In design embodiments, this can be provided by way of a smaller diameter, or a smaller design embodiment, respectively, than is in the respective final coupling region 220. The material which is additionally present in the respective coupling region 220 as a result can subsequently be formed for providing the at least one reinforcement means 230. In other design embodiments, the at least reinforcement means can also be provided by separating, in particular punching or fine blanking. In design embodiments, the at least one reinforcement means 230 can also be configured by a shaping production method, for example a casting method. In design embodiments, the at least one reinforcement means 230 can be provided by metal injection molding (MIM) on the disk-shaped body 210.

In design embodiments, the forming of at least one reinforcement means 230 on one or more coupling regions 220 can comprise grinding of the at least one formed portion in such a manner that the latter forms the third lateral face 233. The third lateral face 233 here can be substantially parallel to the first lateral face 211 or the second lateral face 212 of the disk-shaped body 210.

In design embodiments, the method can further comprise a heat treatment of the adjustment ring 200. Stresses can be removed from the adjustment ring 210, in particular from the disk-shaped body 210 and/or from the at least one reinforcement means 230, by means of the heat treatment.

In design embodiments, the method can further comprise compressing the adjustment ring 200, in particular the plurality of coupling regions 220 and/or the at least one reinforcement means 230 and/or the disk-shaped body 210. As a result, hardening or compacting of the material and/or strain hardening of the respective regions can be achieved. Moreover, a higher strength and/or robustness of the adjustment ring 220, or of the respective regions can be provided. Furthermore, the method can comprise the coating of a surface in the respective coupling regions 220. In design embodiments, the surface coating can be provided in all coupling regions 220. In particular, the surface coating can be provided on the encircling wall 221 and/or an internal face of the at least one reinforcement means 230 (i.e. a face (or side) of the at least one reinforcement means 230 that is adjacent to the encircling wall 221 or faces the latter). A targeted surface coating and/or treatment can be provided in the respective coupling regions, in particular the encircling wall 221 and/or an internal face of the at least one reinforcement means 230. As a result, tribological properties between the vane levers 140 and the coupling regions 220 can be improved. In particular, an improved wear resistance and/or robustness of the adjustment ring 200 and of the vane levers 140 can be achieved.

While the present invention has been described above and is defined in the appended claims, it is to be understood that, alternatively, the invention may also be defined according to the embodiments hereunder:

1. Adjustment ring (200) for a variable turbine geometry (100), comprising:
    a disk-shaped body (210); and
    one or more coupling regions (220) which are formed in the disk-shaped body (210) the coupling regions (220) being spaced apart in the circumferential direction (26), and each coupling region (220) being adapted for at least partially receiving a vane lever (140) for adjusting a guide vane (120) of a variable turbine geometry (100),
    wherein each coupling region (220) circumferentially is fully surrounded by the disk-shaped body (210); and
    wherein the disk-shaped body (210) on one or more coupling regions (220) has at least one reinforcement means (230) which extends in the axial direction (22) from the disk-shaped body (210) and circumferentially at least partially surrounds the coupling region (220).
2. Adjustment ring (200) as per embodiment 1, wherein the disk-shaped body (210) on each coupling region (220) of the plurality of coupling regions (220) has the at least one reinforcement means (230).
3. Adjustment ring (200) as per embodiment 1 or embodiment 2, wherein each coupling region (220) is configured as a passage in the disk-shaped body (210).
4. Adjustment ring (200) as per one of the preceding embodiments, wherein the at least one reinforcement means (230) is configured so as to be integral to the disk-shaped body (210).
5. Adjustment ring (200) as per one of the preceding embodiments, wherein the at least one reinforcement means (230) is configured so as to be collar-shaped.
6. Adjustment ring (200) as per one of embodiments 3 to 5, wherein each coupling region (220), in particular each passage, has an encircling wall (221).
7. Adjustment ring (200) as per embodiment 6, wherein the encircling wall (221) has a radially inner wall portion (222) and a radially outer wall portion (223) which extend substantially tangentially and/or in the circumferential direction (26), and wherein the encircling wall (221) has a first lateral wall portion (224) and a second lateral wall portion (225) which extend substantially in the radial direction (24).
8. Adjustment ring as per embodiment 7, wherein the at least one reinforcement means (230) has a first reinforcement portion (234) and at least one second reinforcement portion (235), the first reinforcement portion (234) surrounding the first lateral wall portion (224) and the at least one second reinforcement portion (235) surrounding the second lateral wall portion (225).

9. Adjustment ring (200) as per one of the preceding embodiments, wherein the at least one reinforcement means (230) circumferentially fully surrounds the coupling region (220).

10. Adjustment ring (200) as per one of the preceding embodiments, wherein the disk-shaped body (210) has a first lateral face (211) and a second lateral face (212).

11. Adjustment ring (200) as per embodiment 10, wherein the at least one reinforcement means (230) extends from the first lateral face (211) and/or from the second lateral face (212).

12. Adjustment ring (200) as per embodiment 10 or embodiment 11, wherein the at least one reinforcement means (230) comprises a first reinforcement means (231) and a second reinforcement means (232), the first reinforcement means (231) extending from the first lateral face (211), and the second reinforcement means (232) extending from the second lateral face (212).

13. Adjustment ring (200) as per one of the preceding embodiments, wherein the at least one reinforcement means (230) extends up to an axial distance (x2) in the axial direction (22), and wherein the disk-shaped body (210) has a body thickness (x1) measured in the axial direction (22).

14. Adjustment ring (200) as per embodiment 13, wherein a ratio of the axial distance (x2) to the body thickness (x1) is between 0.25 and 1.0, in particular between 0.40 and 0.70, preferably between 0.45 and 0.60.

15. Adjustment ring (200) as per embodiment 13 or embodiment 14, wherein the at least one reinforcement means (230) has a minimum width (b1) measured in the radial direction (24), a ratio of the minimum width (b1) to the body thickness (x1) being between 0.10 and 0.70, in particular between 0.15 and 0.50, preferably between 0.20 and 0.35.

16. Adjustment ring (200) as per one of the preceding embodiments, wherein the at least one reinforcement means (230) is configured, on a side that faces away from the coupling region (220), so as to be radiused toward the first lateral face (211) and/or toward the second lateral face (212), the radiused configuration having in particular a radius (r1).

17. Adjustment ring (200) as per one of the preceding embodiments, wherein the disk-shaped body (210) in the region of each coupling location (220) has a radially outer web (213) and a radially inner web (214), the radially outer web (213) defining in particular a first web width (s1) and the radially inner web (214) defining a second web width (s2).

18. Adjustment ring (200) as per embodiment 17, wherein a ratio of the first web width (s1) and/or of the second web width (s2) to the body thickness (x1) is between 0.15 and 0.60, in particular between 0.20 and 0.50, preferably between 0.25 and 0.35.

19. Variable turbine geometry (100) for a turbine (10), comprising:
  a vane bearing ring (110);
  one or more adjustable guide vanes (120) which are in each case rotatably mounted in the vane bearing ring (110) by way of a vane shaft (130); and
  an adjustment ring (200) as per one of the preceding embodiments,
  wherein each guide vane (130) of the plurality of adjustable guide vanes (130) is in each case connected in a rotationally fixed manner to one vane lever (140), and wherein each vane lever (140) is in each case at least partially received in a coupling region (220) for adjusting the respective guide vanes (120).

20. Variable turbine geometry (100) as per embodiment 19, wherein the guide vane (120) is connected in a rotationally fixed manner to the vane shaft (130) at a first end of the vane shaft (130), and wherein the vane lever (140) is connected to the vane shaft (130) at a second end of the vane shaft (130), opposite the first end.

21. Variable turbine geometry (100) as per embodiment 19 or embodiment 20, wherein each vane lever (140) has a radial vane lever portion (141) which extends radially from the vane shaft (130), and an axial vane lever portion (142) which extends axially toward the adjustment ring (200) from the radial vane lever portion (141), the axial vane lever portion (142) in particular extending axially at least partially into the respective coupling region (220).

22. Variable turbine geometry (100) as per one of embodiments 19 to 21, furthermore comprising a cover disk (150) which is disposed so as to be parallel to the vane bearing ring (110), wherein the plurality of adjustable guide vanes (120) are disposed between the cover disk (150) and the vane bearing ring (110).

23. Variable turbine geometry (100) as per one of embodiments 19 to 22, wherein the adjustable guide vanes (120) are rotatably mounted in the vane bearing ring (110) by way of the vane shafts (130) so as to be uniformly distributed in the circumferential direction (26).

24. Variable turbine geometry (100) as per embodiment 22 or embodiment 23, furthermore comprising one or more spacer elements (160) which are disposed on the vane bearing ring (110) so as to be distributed in the circumferential direction (26) in such a manner that they define an axial spacing (161) of the vane bearing ring (110) from the cover disk (150), in particular wherein the plurality of spacer elements (160) comprises at least three spacer elements (10).

25. Variable turbine geometry (100) as per one of embodiments 19 to 24, wherein the adjustment ring (200) is disposed so as to be predominantly radially outside the vane bearing ring (110).

26. Variable turbine geometry (100) as per one of embodiments 19 to 25, wherein the vane bearing ring (110) has, on a side (111) that faces away from the plurality of adjustable guide vanes (120), a mounting (112) for axially mounting the adjustment ring (200).

27. Variable turbine geometry (100) as per one of embodiments 19 to 26, wherein the plurality of adjustable guide vanes (120) are adjustable between a first position, which corresponds to a position of the variable turbine geometry (100) opened to the maximum, and a second position, which corresponds to a position of the variable turbine geometry (100) opened to the minimum, in particular by means of a movement of the adjustment ring (200) in the circumferential direction (26).

28. Turbine (10) for a charging device (1), comprising:
  a turbine housing (11) which defines a feed duct (13) and an outlet duct (14);
  a turbine wheel (12) which, in the turbine housing (11), is disposed between the feed duct (13) and the outlet duct (14); and
  a variable turbine geometry (100) as per one of embodiments 19 to 27, wherein the variable turbine geometry (100) is disposed radially outside the turbine wheel (12).

29. Turbine (10) as per embodiment 28, furthermore comprising an actuating installation (60) which is operatively coupled to the adjustment ring (200) and is adapted for moving the adjustment ring (200) in the circumferential direction (26), in particular wherein the actuating installation (60) is coupled to the adjustment ring (200) by way of one or more levers and/or a control bar.

30. Turbine (10) as per embodiment 28 or embodiment 29, wherein the turbine (10) is a radial turbine.

31. Turbine (10) as per one of embodiments 28 to 30, furthermore comprising a bracing means (300), wherein the bracing means (300) in the axial direction (22) is disposed between the variable turbine geometry (10), in particular the vane bearing ring (110), and a turbine rear wall (16), in particular wherein the bracing means (300) is adapted for bracing the variable turbine geometry (300) in relation to the turbine housing (11).

32. Turbine (10) as per embodiment 31, wherein the bracing means (300) on a radially outer end bears on the vane bearing ring (110), and on a radially inner end bears on the turbine rear wall (16).

33. Turbine (10) as per embodiment 31 or embodiment 32, wherein a heat shield (400) is clamped between the bracing means (300) and the vane bearing ring (110).

34. Turbine (10) as per one of embodiments 31 to 33, wherein the turbine rear wall (16) is configured as part of a bearing housing (40).

35. Charging device (1) for an internal combustion engine or a fuel cell, comprising:
   a bearing housing (40)
   a shaft (30) which is rotatably mounted in the bearing housing (40);
   a compressor (50) having a compressor wheel (52); and
   a turbine (10) as per one of embodiments 28 to 34, wherein the turbine wheel (12) and the compressor wheel (52) are coupled in a rotationally fixed manner to the shaft (30) at opposite ends of the shaft (30).

36. Charging device (1) as per embodiment 35, wherein the compressor (50) comprises a compressor housing (51) in which the compressor wheel (52) is disposed, the bearing housing (40) being connected to the turbine housing (11) and the compressor housing (52).

37. Charging device (1) as per embodiment 35 or embodiment 36, furthermore comprising an electric motor which is disposed in a motor space in the bearing housing (40), wherein the turbine wheel (12) and/or the compressor wheel (52) are/is coupled to the electric motor by way of the shaft (30).

38. Method for producing an adjustment ring (200) for a variable turbine geometry (100), said method comprising the following steps:
   a) providing a disk-shaped body (210);
   b) forming one or more coupling regions (220) in the disk-shaped body (210) in such a manner that the coupling regions (220) are spaced apart in the circumferential direction (26), and each coupling region (220) is adapted for at least partially receiving a vane lever (140) for adjusting a guide vane (120) of a variable turbine geometry (100), and each coupling region (220) circumferentially is fully surrounded by the disk-shaped body (210);
   c) forming at least one reinforcement means (230) on one or more coupling regions (220) in such a manner that the at least one reinforcement means (230) extends from the disk-shaped body (210) in the axial direction (22) and circumferentially at least partially surrounds the coupling region (220).

39. Method as per embodiment 38, wherein the configuring of at least one reinforcement means (230) on one or more coupling regions (220) comprises:
   forming at least one portion of the coupling region (220) in such a manner that the portion extends in the axial direction (22) from the disk-shaped body (210) and circumferentially at least partially surrounds the coupling region (220), the forming comprising in particular deep-drawing.

40. Method as per embodiment 39, wherein the configuring of at least one reinforcement means (230) on one or coupling regions (220) comprises:
   grinding the at least one formed portion in such a manner that said formed portion forms a third lateral face (233) which is substantially parallel to a first lateral face (211) or a second lateral face (212) of the disk-shaped body (210).

41. Method as per one of embodiments 38 to 40, furthermore comprising heat treating the adjustment ring (200).

42. Method as per one of embodiments 38 to 41, furthermore comprising compressing the adjustment ring (200), in particular the plurality of coupling regions (220) and/or the at least one reinforcement means (230) and/or the disk-shaped body (210).

The invention claimed is:

1. An adjustment ring (200) for a variable turbine geometry (100), comprising:
   a disk-shaped body (210); and
   a plurality of coupling regions (220) which are formed in the disk-shaped body (210);
   the coupling regions (220) being spaced apart in the circumferential direction (26); and
   each coupling region (220) adapted for at least partially receiving a vane lever (140) for adjusting a guide vane (120) of a variable turbine geometry (100),
   wherein each coupling region (220) circumferentially is fully surrounded by the disk-shaped body (210); and
   wherein the disk-shaped body (210) on one or more of the coupling regions (220) has at least one reinforcement means (230) which extends in the axial direction (22) from the disk-shaped body (210) and circumferentially at least partially surrounds the coupling region (220).

2. The adjustment ring (200) as claimed in claim 1, wherein the disk-shaped body (210) on each coupling region (220) of the plurality of coupling regions (220) has the at least one reinforcement means (230).

3. The adjustment ring (200) as claimed in claim 1, wherein each coupling region (220) is configured as a passage in the disk-shaped body (210).

4. The adjustment ring (200) as claimed in claim 1, wherein each coupling region (220) has an encircling wall (221).

5. The adjustment ring (200) as claimed in claim 1, wherein the at least one reinforcement means (230) is configured so as to be integral to the disk-shaped body (210).

6. The adjustment ring (200) as claimed in claim 1, wherein the at least one reinforcement means (230) is configured so as to be collar-shaped.

7. The adjustment ring (200) as claimed in claim 1, wherein the at least one reinforcement means (230) circumferentially fully surrounds the coupling region (220).

8. The adjustment ring (200) as claimed in claim 1, wherein the disk-shaped body (210) has a first lateral face (211) and a second lateral face (212).

9. The adjustment ring (200) as claimed in claim 8, wherein the at least one reinforcement means (230) extends from the first lateral face (211) and/or from the second lateral face (212).

10. The adjustment ring (200) as claimed in claim 8, wherein the at least one reinforcement means (230) comprises a first reinforcement means (231) and a second reinforcement means (232), the first reinforcement means (231) extending from the first lateral face (211), and the second reinforcement means (232) extending from the second lateral face (212).

11. The adjustment ring (200) as claimed in claim 1, wherein the at least one reinforcement means (230) extends up to an axial distance (x2) in the axial direction (22), and wherein the disk-shaped body (210) has a body thickness (x1) measured in the axial direction (22), wherein a ratio of the axial distance (x2) to the body thickness (x1) is in the range from 0.25 to 1.0.

12. The adjustment ring (200) as claimed in claim 11, wherein a ratio of the axial distance (x2) to the body thickness (x1) is in the range from 0.40 to 0.70.

13. The adjustment ring (200) as claimed in claim 11, wherein a ratio of the axial distance (x2) to the body thickness (x1) is in the range from 0.45 to 0.60.

14. The adjustment ring (200) as claimed in claim 11, wherein the at least one reinforcement means (230) has a minimum width (Ill) measured in the radial direction (24), a ratio of the minimum width (b1) to the body thickness (x1) being in the range from 0.10 to 0.70.

15. The adjustment ring (200) as claimed in claim 14, wherein a ratio of the minimum width (b1) to the body thickness (x1) is in the range from 0.15 to 0.50.

16. A variable turbine geometry (100) for a turbine (10), comprising:
   a vane bearing ring (110);
   a plurality of adjustable guide vanes (120) which are in each case rotatably mounted in the vane bearing ring (110) by way of one vane shaft (130);
   an adjustment ring (200) as claimed in claim 1,
   wherein each guide vane (130) of the plurality of adjustable guide vanes (130) is in each case connected in a rotationally fixed manner to one vane lever (140), and wherein each vane lever (140) is in each case at least partially received in a coupling region (220) for adjusting the respective guide vane (120).

17. The variable turbine geometry (100) as claimed in claim 16, wherein each vane lever (140) has a radial vane lever portion (141) which extends radially from the vane shaft (130), and has an axial vane lever portion (142) which extends axially toward the adjustment ring (200) from the radial vane lever portion (141), wherein the axial vane lever portion (142) extends axially at least partially into the respective coupling region (220).

18. A turbine (10) for a charging device (1), comprising:
   a turbine housing (11) which defines a feed duct (13) and an outlet duct (14);
   a turbine wheel (12) which, in the turbine housing (11), is disposed between the feed duct (13) and the outlet duct (14); and
   a variable turbine geometry (100) as claimed in claim 16, wherein the variable turbine geometry (100) is disposed radially outside the turbine wheel (12).

19. A charging device (1) for an internal combustion engine or a fuel cell, comprising:
   a bearing housing (40);
   a shaft (30) which is rotatably mounted in the bearing housing (40);
   a compressor (50) having a compressor wheel (52); and
   a turbine (10) as claimed in claim 18, wherein the turbine wheel (12) and the compressor wheel (52) are coupled in a rotationally fixed manner to the shaft (30) at opposite ends of the shaft (30).

20. A method for producing an adjustment ring (200) for a variable turbine geometry (100), said method comprising the following steps:
   a) providing a disk-shaped body (210);
   b) configuring a plurality of coupling regions (220) in the disk-shaped body (210) in such a manner that the coupling regions (220) are spaced apart in the circumferential direction (26), and each coupling region (220) is adapted for at least partially receiving a vane lever (140) for adjusting a guide vane (120) of a variable turbine geometry (100), and each coupling region (220) circumferentially is fully surrounded by the disk-shaped body (210);
   c) forming at least one reinforcement means (230) on one or more of coupling regions (220) in such a manner that the at least one reinforcement means (230) extends from the disk-shaped body (210) in the axial direction (22) and circumferentially at least partially surrounds the coupling region (220).

\* \* \* \* \*